(12) United States Patent
Yasuda et al.

(10) Patent No.: US 10,996,689 B2
(45) Date of Patent: May 4, 2021

(54) FLOW RATE RATIO CONTROL DEVICE WITH FLOW VELOCITY CONTROL MODE

(71) Applicant: HORIBA STEC, Co., Ltd., Kyoto (JP)

(72) Inventors: Tadahiro Yasuda, Irvine, CA (US); Patrick Allen Lowery, Irvine, CA (US); William Wylie White, Irvine, CA (US); Brian James Ebert, Irvine, CA (US); Maximilian Martin Gundlach, Irvine, CA (US); John Thomas Dick, Irvine, CA (US)

(73) Assignee: HORIBA STEC, Co., Ltd., Kyoto (JP)

( * ) Notice: Subject to any disclaimer, the term of this patent is extended or adjusted under 35 U.S.C. 154(b) by 99 days.

(21) Appl. No.: 16/332,171

(22) PCT Filed: Aug. 25, 2017

(86) PCT No.: PCT/JP2017/030637
§ 371 (c)(1),
(2) Date: Mar. 11, 2019

(87) PCT Pub. No.: WO2018/047644
PCT Pub. Date: Mar. 15, 2018

(65) Prior Publication Data
US 2019/0204857 A1    Jul. 4, 2019

(30) Foreign Application Priority Data

Sep. 12, 2016  (JP) .............................. JP2016-177752

(51) Int. Cl.
*G05D 7/06*    (2006.01)
*G01F 1/48*    (2006.01)
(Continued)

(52) U.S. Cl.
CPC ............. *G05D 7/0664* (2013.01); *G01F 1/00* (2013.01); *G01F 1/48* (2013.01); *G05D 11/132* (2013.01)

(58) Field of Classification Search
CPC .... G05D 11/132; G05D 7/0664; G05D 11/13; G05D 7/06
See application file for complete search history.

(56) References Cited

U.S. PATENT DOCUMENTS 5,669,408 A *  9/1997  Nishino ............... G05D 7/0635
                                                    137/487.5
8,849,466 B2 *  9/2014  Ding ..................... G05D 7/0664
                                                    700/282
(Continued)

FOREIGN PATENT DOCUMENTS

JP    2004280788 A    10/2004
JP    2008538656 A    10/2008
(Continued)

OTHER PUBLICATIONS

ISA Japan Patent Office, International Search Report Issued in Application No. 2017030637 dated Oct. 3, 2017, WIPO, 4 pages.

*Primary Examiner* — Chun Cao
(74) *Attorney, Agent, or Firm* — Alleman Hall Creasman & Tuttle LLP

(57) ABSTRACT

A flow rate ratio control device is provided with a main flow path, a plurality of branch flow paths that branch off from a terminus of the main flow path, a plurality of fluid control devices that are provided respectively on each branch flow path, and that are each equipped with a valve and a pressure-based flow rate sensor that is disposed downstream of the valve, and an operation setting unit that establishes settings such that, based on the target flow rate ratio, any one fluid control device from among the plurality of fluid control devices is made to operate in a flow velocity control mode (Continued)

in which the flow velocity of a fluid is controlled upstream of each valve, and the remaining fluid control devices are made to operate in a flow rate control mode in which the flow rate is controlled based on the target flow rates.

10 Claims, 6 Drawing Sheets

(51) Int. Cl.
     *G01F 1/00*        (2006.01)
     *G05D 11/13*      (2006.01)

(56) References Cited

U.S. PATENT DOCUMENTS

| | | | |
|---|---|---|---|
| 2006/0237063 A1* | 10/2006 | Ding | G05D 11/132 137/487.5 |
| 2007/0186983 A1* | 8/2007 | Ding | G05D 11/132 137/487.5 |
| 2010/0030390 A1 | 2/2010 | Yamaguchi et al. | |
| 2010/0269924 A1 | 10/2010 | Yasuda | |

FOREIGN PATENT DOCUMENTS

| | | |
|---|---|---|
| JP | 2009508066 A | 2/2009 |
| JP | 2014059609 A | 4/2014 |
| JP | 2015049569 A | 3/2015 |
| WO | 2006115926 A1 | 11/2006 |
| WO | 2007032851 A1 | 3/2007 |
| WO | 2008072614 A1 | 6/2008 |
| WO | 2009084422 A1 | 7/2009 |

\* cited by examiner

FLOW RATE RATIO CONTROL DEVICE
WITH FLOW VELOCITY CONTROL MODE

TECHNICAL FIELD

The present invention relates to a flow rate ratio control device that performs control such that a flow rate ratio of fluid flowing through a plurality of branch flow paths that branch off a main flow path achieves a target flow rate ratio.

TECHNICAL BACKGROUND

In a semiconductor manufacturing process, in order to uniformize the gas concentration inside a chamber, gas is introduced at a predetermined flow rate ratio from a plurality of locations in the chamber using a flow rate ratio control device (i.e., a ratio controller).

This flow rate ratio control device is provided with a main flow path through which flows a gas mixture that is formed from a plurality of constituents, a plurality of branch flow paths that branch off from a terminus of the main flow path and that are connected to a chamber, and mass flow controllers that are provided respectively on each one of the branch flow paths (see Patent document 1). One mass flow controller from among the plurality of mass flow controllers performs pressure control such that a previously determined target pressure is achieved, while the remaining mass flow controllers respectively perform flow rate control such that individual target flow rates are achieved, with these individual target flow rates being calculated from a target flow rate ratio and from the sum total of the flow rates of the gas flowing through each branch flow path. The target flow rate ratio is achieved as a result of the mass flow controllers of the respective branch flow paths operating in this way.

However, in semiconductor manufacturing processes of recent years, not only is there a demand for a gas flow rate ratio to be controlled accurately, but also for the time required until that flow rate ratio is achieved to be reduced, and for it to be possible to always keep this time constant.

DOCUMENTS OF THE PRIOR ART

Patent Documents

Patent document 1 Published Japanese Translation No. 2008-538656 of the PCT International Publication

DISCLOSURE OF THE INVENTION

Problems to be Solved by the Invention

The present invention was conceived in view of the above-described circumstances, and it is an object thereof to provide a flow rate ratio control device, a program for a flow rate ratio control device, and a flow rate ratio control method that not only enable a target flow rate ratio to be achieved, but also enable the time required until that target flow rate ratio is achieved to be controlled.

Means for Solving the Problem

Namely, the flow rate ratio control device according to the present invention includes a main flow path, a plurality of branch flow paths that branch off from a terminus of the main flow path, a plurality of fluid control devices that are provided respectively on each branch flow path, and that are each equipped with a valve and a pressure-based flow rate sensor that is disposed on a downstream side of the valve, a target receiving unit that receives a target flow rate ratio which is a flow rate distribution ratio for a fluid flowing through each branch flow path, a target flow rate calculating unit that, based on a sum total of measured flow rates of the fluid flowing through each branch flow path as measured by the respective flow rate sensors, and on the target flow rate ratio, calculates a target flow rate for each branch flow path, and an operation setting unit that establishes settings such that, based on the target flow rate ratio, any one fluid control device from among the plurality of fluid control devices is made to operate in a flow velocity control mode in which the flow velocity of a fluid is controlled on an upstream side of each valve, and the remaining fluid control devices other than the one fluid control device that is operating in the flow velocity control mode are made to operate in a flow rate control mode in which the flow rate is controlled based on the target flow rates.

According to this type of structure, at the same time as one of the fluid control devices provided on the branch flow paths is controlling the flow velocity of the fluid, the remaining fluid control devices individually control the flow rates of the fluid flowing through their respective branch flow paths such that a target flow rate ratio is achieved.

Moreover, because each fluid control device is equipped with a pressure-based flow rate sensor, there are no branches in the flow paths in the flow rate sensors. Because of this, it is easy for the fluid to accumulate on the upstream side of a laminar flow element, and the time required until the pressure that is needed to achieve target flow rates and flow velocity is reached can be shortened.

Moreover, when controlling the flow rate ratio of a gas that is formed from a plurality of constituents, it is also possible to cause the gas to flow in the main flow path for a necessary and sufficient time for the gas to be properly mixed, and to thereby enable the constituents of the gas flowing through each branch flow path to be uniformized.

In order to shorten as far as possible the time required until a desired flow velocity is achieved, it is also possible to employ a structure in which the operation setting unit causes the fluid control device that is provided on the branch flow path that, based on the target flow rate ratio, has the largest proportional flow rate to operate in the flow velocity control mode. By employing this type of structure, because the fluid control device provided on the branch flow path having the highest flow rate controls the flow velocity, the mass of the fluid affecting the flow velocity is also the greatest, so that the time required until the target flow velocity is achieved can be shortened.

In order to measure the flow velocity of a fluid and enable flow velocity control to be achieved based on the actual flow velocity itself, it is also possible for there to be further provided a main pressure sensor that is disposed on the upstream side of each valve, and a flow velocity calculating unit that, based on the pressure of a fluid as measured by the main pressure sensor, on the sum total of the measured flow rates of the fluid flowing through each branch flow path as measured by the flow rate sensors, and on a cross-sectional area of the main flow path, calculates the flow velocity of the fluid.

For example, in order to enable a user to perform appropriate flow velocity control manually via trial and error so as to obtain a desired flow velocity using the fluid control device that has been set to the flow velocity control mode, it is also possible for the flow velocity calculating unit to be configured so as to externally output calculated flow velocities, and for the fluid control device that has been set to the flow velocity control mode to receive a target valve opening and then perform control such that the valve is set to this target valve opening, and for the fluid control devices that have been set to the flow rate control mode to control the valves such that deviations between the target flow rates and the measured flow rates as measured by the flow rate sensors are reduced. If this type of structure is employed, then the flow velocity externally output by the flow velocity calculating unit can be displayed as values and time graphs on a display device such as a computer display, and a user is able, while visually verifying the current flow velocity, to adjust the valve opening of the valve of the fluid control device operating in flow velocity control mode to a suitable value such that the target flow velocity is attained.

In order to reduce the effects of hysteresis on the valve opening of each valve relative to the applied voltage, and thereby enable high-speed, high-accuracy flow velocity control or flow rate control to be achieved, it is also possible for each valve to be provided with a position sensor that measures the position of a valve body relative to a valve seat.

In cases in which a target flow rate ratio has already been set based on the results from studying previous control performances, then in order to immediately reproduce the same state in each valve, and to enable the flow velocity and flow rate ratio to reach a desired state in the shortest time, it is also possible for there to be further provided a settings storage unit that, when the ratio of the flow rates of the fluid flowing through each branch flow path has stabilized at the target flow rate ratio, stores stabilized state valve opening data in which the target flow rate ratio is tied to the output from the position sensor of each valve which is in a stabilized state at that target flow rate ratio, and a feedforward control unit that, when stabilized state valve opening data that contains that same target flow rate ratio as the target flow rate ratio received by the target receiving unit is present, controls the valve opening of each valve such that, when the flow rate ratio control is started, the valve opening of each valve matches the output from the position sensor of each valve as contained in the stabilized state valve opening data.

In order to further shorten the time required until the flow velocity of a fluid reaches a desired value, it is also possible to employ a structure in which the conductances of the flow paths from the main flow path to each valve of the respective branch paths are made to be substantially uniform. If this type of structure is employed, then it is possible to eliminate any fluid resistance that might obstruct the inflow of fluid which is necessary to increase pressure, and to reduce the time required until the flow velocity reaches the desired value.

The flow rate ratio control device described below is an example of another expression of the flow rate ratio control device of the present invention. Namely, the flow rate ratio control device according to the present invention includes a main flow path, a first branch flow path that branches off from a terminus of the main flow path, a second branch flow path that branches off from a terminus of the main flow path, a first fluid control device that is provided on the first branch flow path, and that is equipped with a first valve and a pressure-based first flow rate sensor that is disposed on a downstream side of the first valve, a second fluid control device that is provided on the second branch flow path, and that is equipped with a second valve and a pressure-based second flow rate sensor that is disposed on a downstream side of the second valve, a target receiving unit that receives a target flow rate ratio which is a flow rate distribution ratio for a fluid flowing along the first branch flow path and second branch flow path, a target flow rate calculating unit that, based on the measured flow rates of the fluid measured by the first flow rate sensor and the second flow rate sensor, and on the target flow rate ratio, calculates target flow rates for the first branch flow path and the second branch flow path, and an operation setting unit that, based on the target flow rate ratio, sets the control modes of the first fluid control device and the second fluid control device, wherein the operation setting unit causes the first fluid control device and the second fluid control device to operate in a flow velocity control mode in which the flow velocity of a fluid is controlled on an upstream side of each valve, or in a flow rate control mode in which the flow rate is controlled based on the target flow rates.

In order to achieve the same type of operation as that provided by the present invention in an existing flow rate ratio control device, it is also possible to install on an existing flow rate ratio control device a program for a flow rate ratio control device that is used in a flow rate ratio control device that includes a main flow path, a plurality of branch flow paths that branch off from a terminus of the main flow path, and a plurality of fluid control devices that are provided respectively on each branch flow path and are each equipped with a valve and a pressure-based flow rate sensor that is disposed on a downstream side of the valve, and that causes a computer to perform the functions of a target receiving unit that receives a target flow rate ratio which is a flow rate distribution ratio for a fluid flowing along each branch flow path, a target flow rate calculating unit that, based on a sum total of measured flow rates of the fluid flowing through each branch flow path as measured by the respective flow rate sensors, and on the target flow rate ratio, calculates a target flow rate for each branch flow path, and an operation setting unit that establishes settings such that, based on the target flow rate ratio, any one fluid control device from among the plurality of fluid control devices is made to operate in a flow velocity control mode in which the flow velocity of a fluid is controlled on an upstream side of each valve, and the remaining fluid control devices other than the one fluid control device that is operating in the flow velocity control mode are made to operate in a flow rate control mode in which the flow rate is controlled based on the target flow rates.

The program for a control rate ratio control device may be electronically distributed, or may be stored on a storage medium such as a CD, DVD, or flash memory or the like, and used in the shape of a program storage medium for a flow rate ratio control device.

A flow rate ratio control method according to the present invention is a flow rate ratio control method that uses a flow rate ratio control device that includes a main flow path, a plurality of branch flow paths that branch off from a terminus of the main flow path, and a plurality of fluid control devices that are provided respectively on each branch flow path and are each equipped with a valve and a pressure-based flow rate sensor that is disposed on a downstream side of the valve, and that includes a step in which a target flow rate ratio which is a flow rate distribution ratio for a fluid flowing along each branch flow path is received, a step in which, based on a sum total of measured flow rates of the fluid flowing through each branch flow path as measured by the respective flow rate sensors, and on the target flow rate ratio, a target flow rate is calculated for each branch flow path, and a step in which settings are established such that, based on the target flow rate ratio, any one fluid control device from among the plurality of fluid control devices is made to operate in a flow velocity control mode in which the flow velocity of a fluid is controlled on an upstream side of each valve, and the remaining fluid control devices other than the one fluid control device that is operating in the flow velocity control mode are made to operate in a flow rate control mode in which the flow rate is controlled based on the target flow rate.

Effects of the Invention

In this way, according to the flow rate ratio control device according to the present invention, not only is it possible to also control the flow velocity of a fluid on the upstream side of each valve, but it is also possible to control the flow rate ratio between the fluid flowing through each branch flow path. Accordingly, the time required until a desired flow velocity is achieved can be shortened, and provided that the conditions are the same, this required time can be made substantially the same every time.

DESCRIPTION OF THE REFERENCE CHARACTERS

Figure 1:
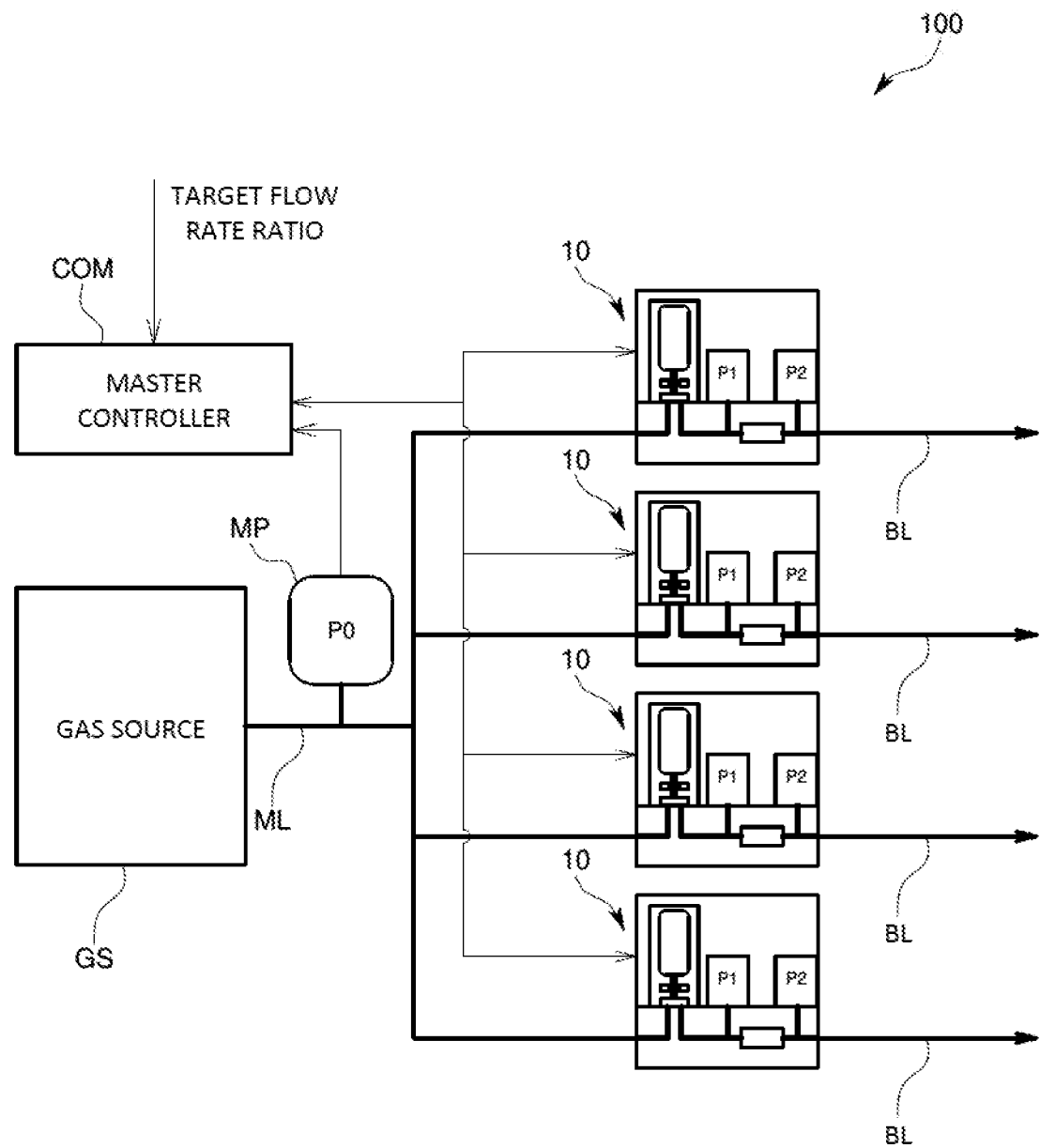
FIG. 1 is a typical view showing a flow rate ratio control device according to an embodiment of the present invention.

100 . . . Flow rate ratio control device
ML . . . Main flow path
BL . . . Branch flow path
10 . . . Mass flow controller (Fluid control device)
3 . . . Valve
4 . . . Flow rate sensor
61 . . . Target receiving unit
62 . . . Target flow rate calculating unit
63 . . . Operation setting unit
64 . . . Flow rate calculating unit
66 . . . Settings storage unit
67 . . . Feedforward control unit

BEST EMBODIMENTS FOR IMPLEMENTING THE INVENTION

A flow rate ratio control device 100 according to an embodiment of the present invention will now be described with reference to the respective drawings. The flow rate ratio control device 100 shown in FIG. 1 is used to introduce a gas mixture containing a variety of constituents that are used for film-formation inside a vacuum chamber in which wafers are housed during a semiconductor manufacturing process. The flow rate ratio control device 100 introduces this gas mixture via a plurality of intake apertures that are provided in the chamber at a flow rate ratio that is predetermined for each aperture.

The flow rate ratio control device 100 is provided with a main flow path ML whose upstream side is connected to a gas source GS, a main pressure sensor MP that is provided on the main flow path ML, a plurality of branch flow paths BL that branch off from the main flow path ML, a plurality of mass flow controllers 10 which are fluid control devices provided on the respective branch flow paths BL, and a master controller COM that collectively controls the respective mass flow controllers 10. The flow rate ratio control device 100 is configured such that it not only performs control such that the flow rate ratio of the gas mixture flowing through each branch flow path BL is at a target flow rate ratio, but is also able to perform control such that the flow velocity of the gas mixture at a particular location in the main pressure sensor MP is at a desired value. The master controller COM inputs commands to each mass flow controller 10 based on a target flow rate ratio for the flow rates of the gas mixture flowing through each branch flow path BL that it has received from a user, and causes one of these mass flow controllers 10 to operate in a flow velocity control mode that is used for performing flow velocity control. The master controller COM inputs individual target flow rates calculated from the target flow rate ratio into the remaining mass flow controllers 10 and causes them to operate in a flow rate control mode.

Each unit will now be described in detail.

A gas mixture containing a mixture of a plurality of constituents is stored in the gas source GS, and this gas mixture is supplied to the main flow path ML.

The main flow path ML is a single hollow pipe, and no components such as a laminar flow element 43 or the like that might generate flow path resistance are present within this pipe. Namely, the flow paths from the gas source GS as far as each mass flow controller 10 provided on the respective branch flow paths BL are empty, with no components that might generate any other fluid resistance being present within these flow paths. Accordingly, the conductances of the pipes are able to remain substantially constant.

The main pressure sensor MP measures the pressure of the gas mixture flowing through the main flow path ML. Based on the pressure measured by the main pressure sensor MP, the flow velocity of the gas mixture at the location where the main pressure sensor MP is provided is monitored.

Each of the branch flow paths BL branches off respectively from one terminus of the main flow path ML, and an upstream side of each branch flow path BL is connected to the main flow path ML. A downstream side of each branch flow path BL is connected to a mutually different location in the chamber. Note that, in the present embodiment, four branch flow paths BL are provided, however, it is sufficient if two or more branch flow paths BL are provided. In the following description, where necessary, the four branch flow paths BL are referred to as a first through fourth branch flow path BL in sequence from the upper side in FIG. 1.

Figure 2:
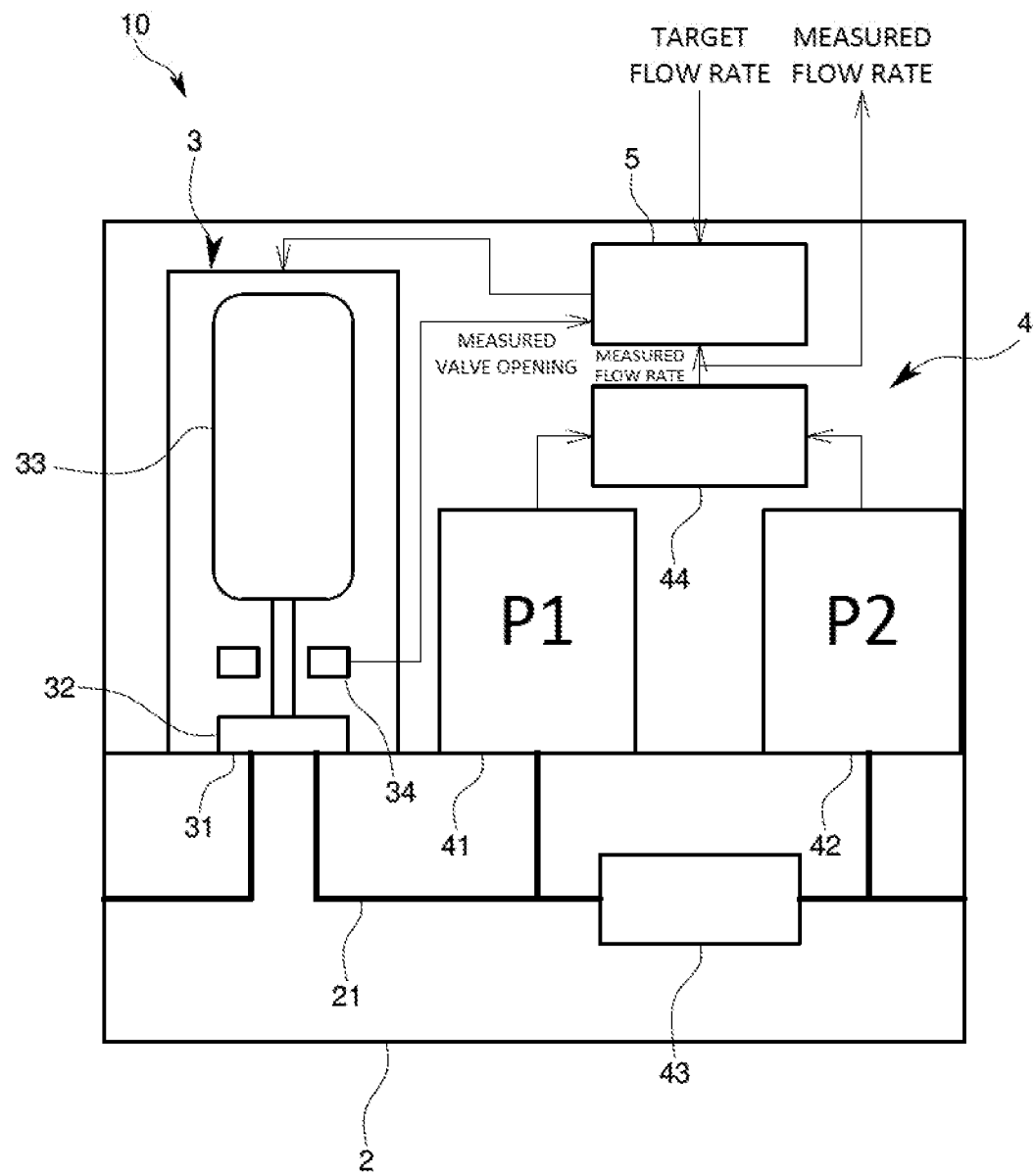
FIG. 2 is a typical view showing a mass flow controller for a flow rate control mode according to the same embodiment.
Figure 3:
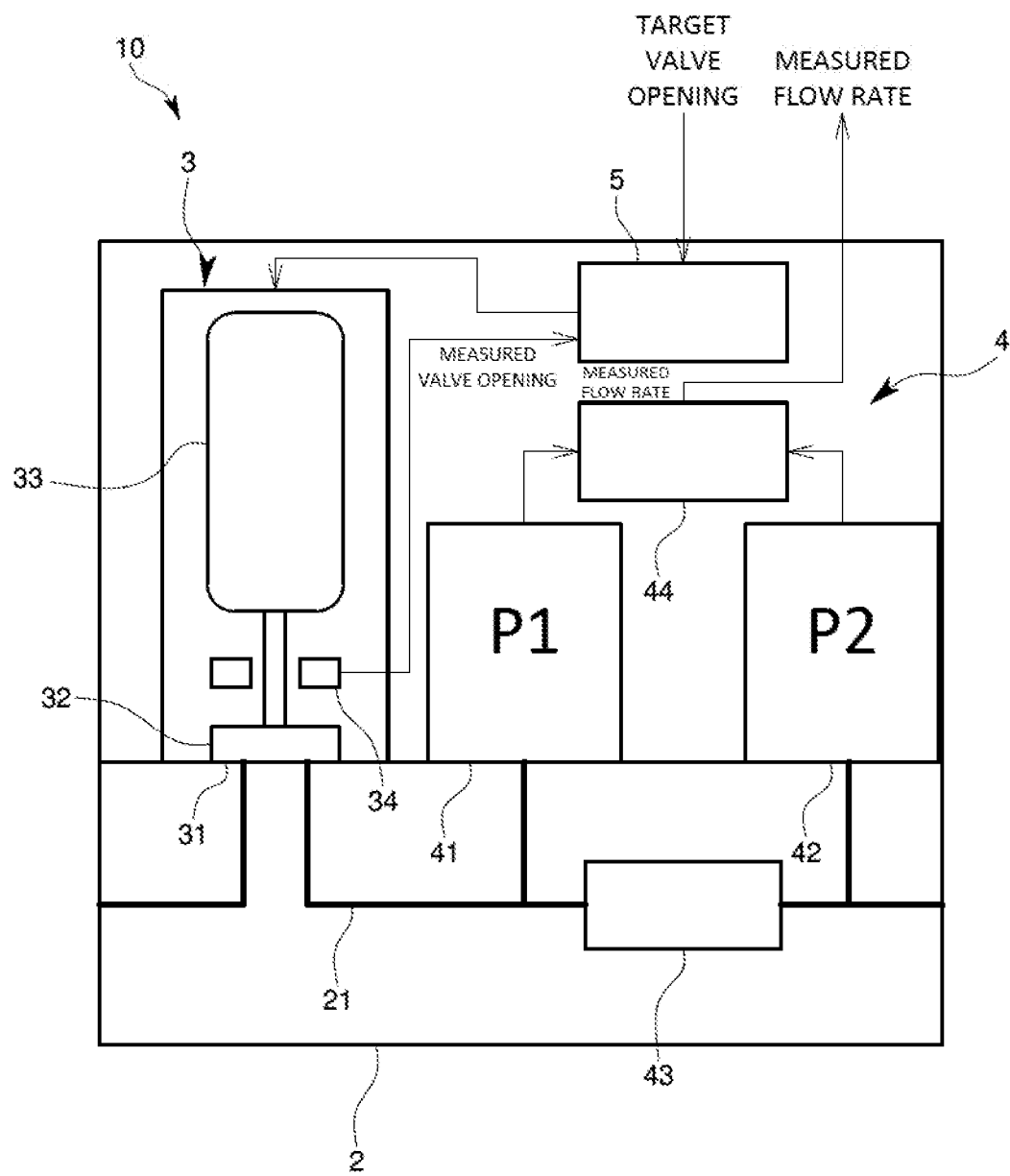
FIG. 3 is a typical view showing a mass flow controller for a flow velocity control mode according to the same embodiment.

Each of the mass flow controllers 10 is configured by the same type of fluid instrument, and is able to independently control the flow rate of a fluid passing through itself. Namely, as is shown in FIG. 1 through FIG. 3, each mass flow controller 10 is provided with a block 2 inside which is formed an internal flow path 21, a valve 3 that is provided on the internal flow path 21, a pressure-based flow rate sensor 4 that is provided on the internal flow path 21 on the downstream side of the valve 3, and a control board that governs the control of the valve 3 and the like. Namely, the mass flow controller 10 is configured by packaging together these elements and, as a stand-alone unit, is able to execute flow rate feedback control based on deviations between a target flow rate that has been set and a measured flow rate measured by the flow rate sensor 4.

Each part of the mass flow controllers 10 will now be described in detail. Note that the mass flow controllers 10 provided on the respective branch flow paths BL are referred to respectively as a first through fourth mass flow controller 10 so as to correspond to the first through fourth branch flow paths BL. Moreover, the same type of naming convention is used when describing the respective component elements making up each mass controller 10.

Each valve 3 is provided with a valve seat 31, a valve body 32 that is able to move towards and away from the valve seat 31, a piezo actuator 33, for example, that moves the valve body 33, and a position sensor that detects the position of the valve body 32 relative to the valve seat 31, namely, the valve opening. The displacement in the direction of a voltage applied to each piezo actuator 33 as an independent body has hysteresis, however, by controlling this applied voltage while providing feedback about the position of the valve body 32 as measured by the position sensor, this hysteresis can essentially be disregarded. The position sensor is, for example, an eddy current-based non-contact displacement sensor. This displacement sensor is equipped with a probe and a measurement surface positioned facing the probe, and either the probe or the measurement surface is moved substantially in synchronization with, and by essentially the same amount as, the valve body 32, while the other one of the probe and the measurement surface is held stationary in a predetermined position.

Each flow rate sensor 4 is provided with an upstream-side pressure sensor 41, the laminar flow element 43, a downstream-side pressure sensor 42, and a flow rate output circuit 44 that, based on the respective measured pressures measured by the upstream-side pressure sensor 41 and the downstream-side pressure sensor 43, outputs a flow rate. Because differential pressure is generated by the laminar flow element 43 both in front of and behind itself, the flow rate output circuit 44 is configured such that it calculates the flow rate of a fluid flowing through the branch flow path BL on which that flow rate sensor 4 is provided from the differential pressure measured by the upstream-side pressure sensor 41 and the downstream-side pressure sensor 42, and then outputs this calculated flow rate. As is shown in FIG. 1, the pressure-based flow rate sensor 4 is not configured so as to cause a portion of the fluid to flow through a bypass, as would be the case with a heat-based flow rate sensor 4, and all of the fluid passes through the laminar flow element 43 and flows to the downstream side where the downstream-side pressure sensor 42 is located.

The control board is configured by what is known as a computer that is provided with a CPU, memory, an A/D-D/A converter, and input/output devices and the like, and, as a result of a program stored in memory being executed and enabling the various devices to operate in collaboration with each other, is able to perform the functions of at least a valve control unit 5.

The valve control unit 5 oversees the controlling of the valve 3 and, in the present embodiment, is configured so as to execute either one of at least two control modes, namely, the flow rate control mode or the flow velocity control mode in accordance with commands from the above-described master controller COM. In the present embodiment, the valve control units 5 of the mass flow controllers 10 that are provided on slave lines, which are the branch flow paths BL other than a master line (namely, the branch flow path BL having the largest target flow ratio), operate in flow rate control mode. Specifically, as is shown in FIG. 2, based on deviations between individually set target flow rates, and the measured flow rates of the gas mixture flowing through the branch flow paths BL that are measured by the flow rate sensors 4, the valve control units 5 of the mass flow controllers 10 that are provided on slave lines excluding the master line perform flow rate feedback control such that these deviations are reduced. More specifically, the valve control units 5 calculate a target valve opening based on deviations between the target flow rates and the measured flow rates, and the voltage applied to the valves 3 is controlled such that the valve openings shown by each position sensor 34 are set at the target valve opening. In other words, the valve control unit 5 of the mass flow controller 10 provided on the master line does not operate in flow rate control mode, while the valve control units 5 of the mass flow controllers 10 provided on the plurality of slave lines each operate independently in flow rate control mode. Additionally, if the individual mass flow controllers 10 provided on the slave lines are focused on, it is seen that a feedback loop for the measured flow rate is configured individually in the control system of each mass flow controller 10.

In contrast, as is shown in FIG. 3, the valve control unit 5 of the mass flow controller 10 provided on the master line operates in flow velocity control mode. Namely, if the mass flow controller 10 provided on the master line is focused on, it is seen that feedback relating to the measured flow rate as measured by the flow rate sensor 4 is not supplied in order for the valve control unit 5 to control the valve, but that control is performed based on the output from the position sensor 34 such that a target valve opening input as an external input is obtained. In other words, in flow velocity control mode, the feedback loop relating to the measured flow rate that is used to perform valve control the mass flow controller 10 is cut, and only a feedback loop relating to the measured valve opening measured by the position sensor 34 is configured.

The master controller COM is configured by what is known as a computer that is provided with a CPU, memory, an A/D-D/A converter, input/output devices, and a display 7 and the like, and, as a result of a program for the flow rate ratio control device 100 that is stored in a predetermined area of the memory being executed and operating in collaboration with the various devices, is able to perform the functions of at least a target receiving unit 61, a target flow rate calculating unit 62, an operation setting unit 63, a flow velocity calculating unit 64, and a learning control unit 65.

Each unit will now be described.

The target receiving unit 61 receives via the aforementioned input/output device a target flow rate ratio, which is a flow rate distribution ratio for a fluid flowing through each branch flow path BL. The target flow rate ratio is, for example, the value of the flow ratio in each branch flow path BL.

The target flow rate calculating unit 62 is configured such that it communicates with each mass flow controller 10, and sequentially acquires information relating to flow rates. More specifically, based on the sum total of measured flow rates of the fluid flowing through each branch flow path BL as measured by each flow rate sensor 4 of the respective mass flow controllers 10, and on the target flow rate ratio, the target flow rate calculating unit 62 calculates the respective target flow rates for each branch flow path BL. Here, the sum total of the measured flow rates of the gas mixture flowing through each branch flow path BL is also the flow rate of the gas mixture flowing through the main flow path ML. In the following description, the sum total of the measured flow rates of the gas mixture flowing through each branch flow path may also be referred to as the total flow rate. The target flow rate calculating unit 62 uses the target flow rate ratio in order to calculate as the respective target flow rate for each branch flow path BL how much of the total flow rate should be occupied by each flow rate.

The operation setting unit 63 establishes settings so that one of the respective mass flow controllers 10 is operated in flow velocity control mode, while the remaining mass flow controllers 10 are operated in flow rate control mode. Which of the mass flow controllers 10 is selected to operate in flow velocity control mode is determined based on the received target flow rate ratio. In the present embodiment, a command is output from the operation setting unit 63 to the mass flow controller 10 provided on the branch flow path BL having the greatest flow rate of the gas mixture that is flowing when the target flow rate ratio is achieved commanding that this mass flow controller 10 operate in flow velocity control mode. Here, a variety of possible cases may exist, such as a case in which the target flow rate ratios gradually reduce in sequence from the first to the fourth branch flow path BL, or a case in which the proportion of the total flow rate occupied by the flow rate flowing through the second branch flow path BL is the highest. Accordingly, the mass flow controller 10 that operates in the flow velocity control mode might be any one of the first through fourth mass flow controllers 10 depending on the target flow rate ratio. The operation setting unit 63 of the present embodiment causes the mass flow controller 10 that is provided on the branch flow path BL having the greatest flow rate to operate in flow velocity control mode, and is able to change the inflow rate of gas mixture per unit time in the flow paths from the main flow path ML to the valve 3 of each mass flow controller 10 to the maximum level. Accordingly, it is possible to change the flow velocity of the gas mixture flowing through the main flow path ML to as fast as the speed of sound, for example, within a short period of time.

Moreover, the operation setting unit 63 outputs commands to the mass flow controllers 10 other than the mass flow controller 10 operating in flow velocity control mode commanding them to operate in the above-described flow rate control mode, and also outputs target flow rates for each one of the respective branch flow paths BL that have been calculated by the target flow rate calculating unit 62. For example, if a command is output commanding the first mass flow controller 10 to operate in flow velocity control mode, then commands are output to the second through fourth mass flow controllers 10 commanding that they each operate in flow rate control mode, together with their corresponding target flow rates.

The flow velocity calculating unit 64 calculates the flow velocity of the gas mixture at the point where the main pressure sensor MP is provided based on the measured pressure as measured by that main pressure sensor MP. Specifically, the flow velocity calculating unit 64 calculates the flow velocity by dividing the mass flow rate of the gas mixture in the main flow path ML by the measured pressure and the horizontal cross-sectional area of the pipe forming the main flow path ML. Note that the sum total of the measured flow rates measured by the flow rate sensor 4 of each mass flow controller 10 is used as the mass flow rate of the gas mixture flowing through the main flow path ML.

The flow velocity calculating unit 64 is configured such that it outputs sequentially calculated flow velocities to the outside. Signals showing the flow velocities are externally output to the display 7 of the master controller COM so that current flow velocity is displayed. Note that it is also possible to employ a structure in which the flow velocity calculating unit 64 is able, for example, to output an analog electrical signal corresponding to the flow velocity, and this analog signal is input into a data logger or the like. A user views the flow velocity of the gas mixture displayed on the display 7, and determines whether this flow velocity is larger or smaller than the target flow velocity. The user then alters the target valve opening of the valve 3 of the mass flow controller 10 that has been set to flow velocity control mode. Specifically, when the flow velocity of the gas mixture displayed on the display 7 via the input/output device provided in the master controller COM is smaller than the target flow velocity, the user alters the setting values such that the target valve opening is enlarged. Conversely, when the flow velocity of the gas mixture displayed on the display 7 is larger than the target flow velocity, the user alters the setting values such that the target valve opening is reduced. Note that because the amount of change in the velocity of the gas mixture relative to the amount that the target valve opening is altered is not constant as it is affected by a variety of parameters such as the type of gas and the supply pressure of the gas source GS and the like, the user may adjust the flow velocity by gradually altering the target valve opening in tiny stages. Moreover, even if the user does not designate which specific mass flow controller 10 the target valve opening input by the user into the master controller COM is to be set for, that target valve opening is automatically transmitted to the mass flow controller 10 which is operating in flow velocity control mode. In this way, the valve opening of the valve 3 of the mass flow controller 10 which is operating in flow velocity control mode is altered, and the conductances of the flow paths from the main flow path ML as far as the valve 3 of each branch flow path BL are adjusted, and, as a result, the flow velocity is controlled.

When a combination of a particular target flow rate ratio and target flow velocity is achieved for the first time, the learning control unit 65 acquires the valve openings of the valves 3 of each one of the mass flow controllers 10 at that time from the output from the respective position sensors 34, and stores these valve openings. Additionally, when the same target flow rate ratio is received by the target receiving unit 61, the learning control unit 65 performs feedforward control for the valve openings of the valves 3 of each one of the mass flow controllers 10 such that the valve openings of the valves 3 that correspond to that target flow rate ratio become an initial value.

More specifically, the learning control unit 65 is configured by a settings storage unit 66 and a feedforward control unit 67.

When the ratio of the flow rates of the fluids flowing through each branch flow path BL has stabilized at the target flow rate ratios, the settings storage unit 66 stores stabilized state valve opening data in which the target flow rate ratio is tied to the output from the position sensor 34 of each valve 3 which is in a stabilized state at that target flow rate ratio. The decision that a flow velocity and a flow rate ratio have stabilized at a target flow velocity and a target flow rate ratio can be triggered based on whether or not a stabilized state has continued for a predetermined length of time, or by a user deciding that a stabilized state has been attained and inputting this fact into the master controller COM.

The feedforward control unit 67 is configured such that, when stabilized state valve opening data that contains that same target flow rate ratio as the target flow rate ratio received by the target receiving unit 61 is present, the feedforward control unit 67 controls the valve opening of each valve 3 such that, when the flow rate ratio control is started, the valve opening of each valve 3 matches the output from the position sensor 34 of each valve 3 as shown in the stabilized state valve opening data. The control performed by the feedforward control unit 67 is either executed simultaneously with, or alternatively, is executed prior to the start of the flow rate control or the flow velocity control performed by the respective mass flow controllers 10.

According to the flow rate ratio control device 100 having the above-described structure, the flow velocity of a gas mixture is controlled by the mass flow controller 10 that is provided on the branch flow path BL having the greatest flow rate out of all the mass flow controllers 10, and the target flow rate ratio is achieved via flow rate control performed by the other mass flow controllers 10 once this flow velocity control has been achieved. Because of this, the quantity of gas mixture associated with the flow velocity control can be supplied in a short span of time, so that the time required until the flow velocity reaches, for example, the speed of sound can be reduced compared to the conventional technology. Moreover, because the time required for the flow velocity to reach the speed of sound is reduced, even if a semiconductor manufacturing recipe is altered so that the target flow rate ratio is consequently modified, the gas mixture can still be introduced immediately through the plurality of intake apertures in a chamber via the respective branch flow paths BL at the desired flow rate ratio. Accordingly, any dead time until uniformity of the concentration of the gas mixture inside the chamber is achieved can be shortened compared to the conventional technology, and control delays and control failures can be decreased when a recipe is altered.

Moreover, because the valve 3 of each mass flow controller 10 is equipped with the position sensor 34, hysteresis arising from the operating direction can be suppressed, and the valve opening of the valves 3 can be altered immediately to the valve opening of a stabilized state using the feedforward control that was based on previous results obtained by the learning control unit 65. Accordingly, the rise time when flow rate ratio control is started can also be shortened, so that a target flow rate ratio and a target flow velocity can both be achieved immediately.

Furthermore, in the present embodiment, because a structure is employed in which a user is able to alter the valve opening of the valve 3 of the mass flow controller 10 that is operating in flow velocity control mode while viewing a measured flow velocity displayed on the display 7, an appropriate valve opening can be selected even when the relationship between the valve opening and the flow velocity is unclear, or when the linearity of this relationship is poor.

Additionally, the fact that no fluid resistance element that might reduce conductance is present on the flow paths between the gas source GS and the valves 3 of each branch flow path BL assists in the achieving of a high flow velocity in a short time span.

Moreover, because the flow rate control device of the present embodiment also enables the flow velocity of a gas mixture to be held steady at a desired value, it is also possible to make the flow velocity slower than normal in order that the respective constituents of the gas mixture supplied from the gas source GS are adequately mixed together. Accordingly, not only can the flow velocity be increased, but the quality of the gas mixture can also be improved compared to the conventional quality.

Additional embodiments will now be described.

Figure 5:
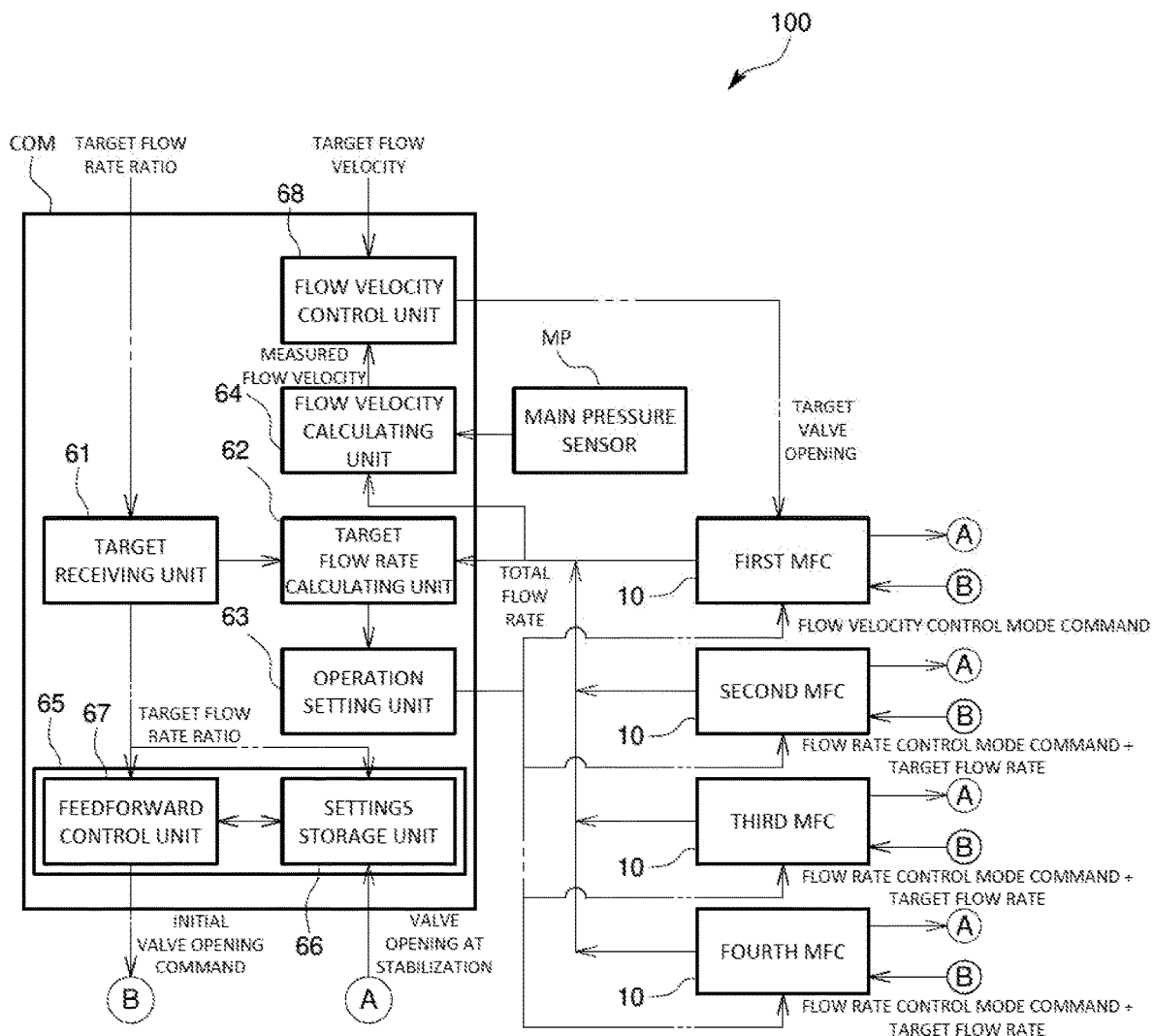
FIG. 5 is a function block diagram showing a flow rate ratio control device according to another embodiment of the present invention.

As is shown in the function block diagram in FIG. 5, it is also possible for the master controller COM to be provided with a flow velocity control unit 68 that, based on a flow velocity calculated by the flow velocity calculating unit 64 and on a target flow velocity, controls the flow velocity by controlling the valve opening of the valve 3 of one of the mass flow controllers 10. If this type of structure is employed, then even if there is no human intervention by a user in the flow rate ratio control device 100, an ideal flow velocity and flow rate ratio can be achieved automatically.

Figure 4:
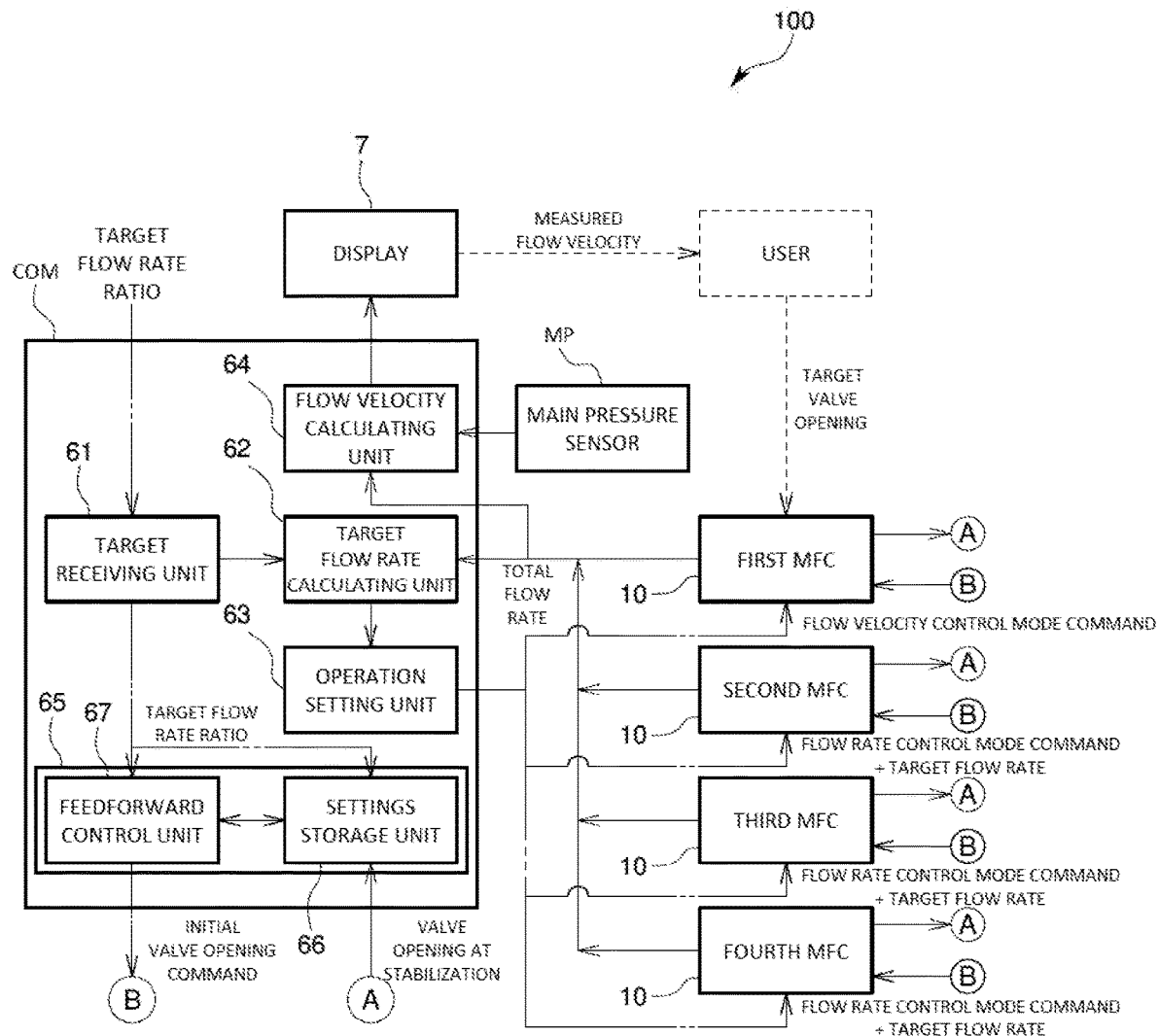
FIG. 4 is a function block diagram showing the flow rate ratio control device according to the same embodiment.
Figure 6:
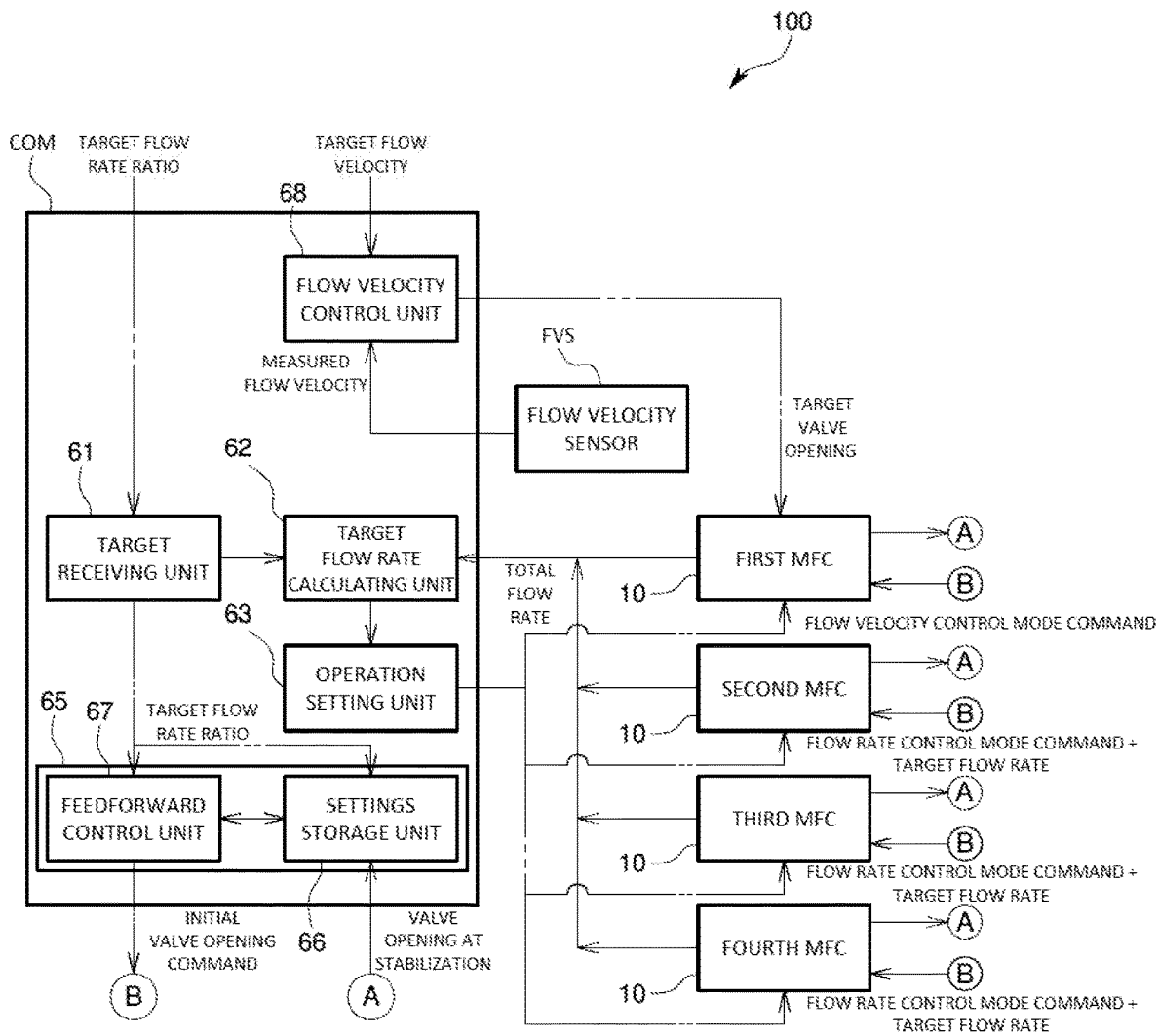
FIG. 6 is a function block diagram showing a flow rate ratio control device according to yet a further embodiment of the present invention.

Moreover, it is also possible to provide a flow velocity sensor instead of the main pressure sensor, and to thereby enable the flow velocity to be measured directly instead of by performing calculation processing. More specifically, as is shown in the function block diagram in FIG. 6, it is also possible to control the valve opening of the valve 3 of the mass flow controller 10 disposed on the master line by measuring the actual flow velocity itself of the fluid in the flow paths between the gas source GS and the valves 3 of the respective mass flow controllers 10. In other words, as in the respective embodiments shown in FIG. 1, FIG. 4, and FIG. 5, it is also possible to provide, for example, an ultrasonic or hotwire flow velocity sensor FVS instead of the main pressure sensor MP, and, at the same time as a user is viewing the measured flow rate from this flow velocity sensor FVS, for this user to suitably adjust the valve opening of the valve 3 of the mass flow controller 10 provided on the master line such that the target flow velocity is attained. Moreover, as is shown in FIG. 6, it is also possible for output from the flow velocity sensor FVS to be fed back to the flow velocity control unit 68, and for the valve opening of the valve 3 of the mass flow controller 10 provided on the master line to be controlled accordingly such that the target flow velocity is attained. The flow velocity sensor FVS is not limited to those types described above, and a variety of types may be used such as an electromagnetic flow velocity sensor that is based on Faraday's law of electromagnetic induction, or a flow velocity sensor that uses a Pitot tube, and the like. Additionally, it is also possible to provide a flow rate sensor instead of the main pressure sensor MP, and to convert a measured flow rate into a flow velocity using, for example, Bernoulli's theorem.

In the above-described embodiments, the fluid control device is a mass flow controller, however, it is also possible for other fluid control devices to be provided on each branch flow path. For example, it is also possible to use as the fluid control device a valve and some type of flow rate sensor that have not been packaged together as a mass flow controller. Moreover, the fluid whose flow rate ratio is controlled is not limited to being a gas mixture, and may also be one single type of gas, or may also be a liquid.

In the above-described embodiments, a structure is employed in which the valve opening of the valve in the fluid control device provided on the branch flow path having the greatest fluid flow rate, the conductance of this flow path, and additionally the flow velocity thereof are controlled based on a target flow rate ratio, however, it is also possible, for example, to take the branch flow path having the second greatest fluid flow rate or the third greatest fluid flow rate as the master line, and to use the remaining branch flow paths as slave lines, and to control the conductance or the flow velocity using the fluid control device provided on the master line. Furthermore, the fluid control device is not limited to being a pressure-based mass flow controller, and it is also possible to use, for example, a thermal mass flow controller that is equipped with thermal flow rate sensor.

It is also possible for the functions of each of the units whose functions are performed by a computer, namely, the target receiving unit, the target flow rate calculating unit, and the operation setting unit and the like described in the foregoing respective embodiments to be performed, for example, using the calculating source of a controller of a CVD or the like having a chamber instead of these functions being performed by the master controller. Alternatively, it is also possible for these functions to be performed by a separately provided computer.

It is also possible for a pneumatic valve to be provided respectively on the upstream side of each control valve provided on the respective branch flow paths. If this type of structure is employed, then it is possible to improve the sheet leakage performance in each branch flow path even more.

It is also possible to additionally provide a reference flow rate calculating unit that takes a volume in the pipe from the gas source to the control valve or pneumatic valve provided on each branch flow path as a reference volume, and that calculates the flow rate of fluid flowing into or flowing out from this reference volume from the amount of change in the pressure values measured by the main pressure sensor provided on the main flow path.

Here, the reference volume is the sum total of the volume of the main flow path and the volume on the upstream side of the points where the control valve or pneumatic valve is provided on each of the branch flow paths. Moreover, if the reference volume is already known, then the flow rate of fluid flowing into this reference volume, or the flow rate of fluid flowing out from this reference volume can be calculated from an equation of state for gas, and from the amount of temporal change of the pressure in the reference volume.

For example, it is also possible to provide an examination unit that examines whether or not errors or defects are present via the following process. Namely, for example, each control valve or pneumatic valve is firstly placed in a fully closed state. Next, a predetermined quantity of fluid is supplied until a predetermined pressure is generated in the reference volume. Thereafter, the control valve or pneumatic valve of the branch flow path on which the mass flow controller being examined is located is opened, and a predetermined set flow rate is input into this mass flow controller, which is then operated. In this state, the examination unit compares the flow rate flowing out from the reference volume calculated by the reference flow rate calculating unit with the measured flow rate measured by the mass flow controller, and is consequently able to examine whether or not errors or defects are present.

By forming the reference flow rate calculating unit and the examination unit in this way, the flow rate ratio control device is able to perform self-diagnosis using only the pressure sensors and flow rate sensors with which it is provided.

In addition to these, various other modifications and combinations may also be made to the embodiments insofar as they do not depart from the spirit or scope of the present invention.

INDUSTRIAL APPLICABILITY

According to the present invention, it is possible to provide a flow rate ratio control device that not only enables the flow velocity of a fluid to be controlled on the upstream side of each valve, but also enables the flow rate ratio of a fluid flowing through each branch flow path to be controlled.

What is claimed is:

1. A flow rate ratio control device comprising:
a main flow path;
a plurality of branch flow paths that branch off from a terminus of the main flow path;
a plurality of fluid control devices that are provided respectively on each branch flow path, and that are each equipped with a valve and a pressure-based flow rate sensor that is disposed on a downstream side of the valve;
a target receiving unit that receives a target flow rate ratio which is a flow rate distribution ratio for a fluid flowing through each branch flow path;
a target flow rate calculating unit that, based on a sum total of measured flow rates of the fluid flowing through each branch flow path as measured by the respective flow rate sensors, and on the target flow rate ratio, calculates a target flow rate for each branch flow path; and
an operation setting unit that establishes settings such that, based on the target flow rate ratio, any one fluid control device from among the plurality of fluid control devices is made to operate in a flow velocity control mode in which a flow velocity of a fluid is controlled on an upstream side of each valve, and the remaining fluid control devices other than the one fluid control device that is operating in the flow velocity control mode are made to operate in a flow rate control mode in which the flow rate is controlled based on the target flow rates, wherein
the valve of the fluid control device which is operating in the flow velocity control mode is configured to be controlled on the basis of a measured flow velocity or the flow velocity calculated as the flow velocity of the fluid on the upstream side of each valve.

2. The flow rate ratio control device according to claim 1, wherein the operation setting unit is configured so as to cause the fluid control device that is provided on the branch flow path that, based on the target flow rate ratio, has the largest proportional flow rate to operate in the flow velocity control mode.

3. The flow rate ratio control device according to claim 1, further comprising:
a main pressure sensor that is disposed on the upstream side of each valve; and
a flow velocity calculating unit that, based on the pressure of a fluid as measured by the main pressure sensor, on the sum total of the measured flow rates of the fluid flowing through each branch flow path as measured by the flow rate sensors, and on a cross-sectional area of the main flow path, calculates the flow velocity of the fluid.

4. The flow rate ratio control device according to claim 3, wherein
the flow velocity calculating unit is configured so as to externally output calculated flow velocities, and
the fluid control device that has been set to the flow velocity control mode receives a target valve opening and then performs control such that the valve is set to this target valve opening, and
the fluid control devices that have been set to the flow rate control mode control the valves such that deviations between the target flow rates and the measured flow rates as measured by the flow rate sensors are reduced.

5. The flow rate ratio control device according to claim 1, wherein each valve is provided with a position sensor that measures the position of a valve body relative to a valve seat.

6. The flow rate ratio control device according to claim 5 further comprising:
a settings storage unit that, when the ratio of the flow rates of the fluid flowing through each branch flow path has stabilized at the target flow rate ratio, stores stabilized state valve opening data in which the target flow rate ratio is tied to the output from the position sensor of each valve which is in a stabilized state at that target flow rate ratio, and a feedforward control unit that, when stabilized state valve opening data that contains that same target flow rate ratio as the target flow rate ratio received by the target receiving unit is present, controls the valve opening of each valve such that, when the flow rate ratio control is started, the valve opening of each valve matches the output from the position sensor of each valve as contained in the stabilized state valve opening data.

7. The flow rate ratio control device according to claim 1, wherein flow path conductances from the main flow path to each valve of the respective branch paths are made to be substantially uniform.

8. A flow rate ratio control device comprising:
a main flow path;
a first branch flow path that branches off from a terminus of the main flow path;
a second branch flow path that branches off from a terminus of the main flow path;
a first fluid control device that is provided on the first branch flow path, and that is equipped with a first valve and a pressure-based first flow rate sensor that is disposed on a downstream side of the first valve;
a second fluid control device that is provided on the second branch flow path, and that is equipped with a second valve and a pressure-based second flow rate sensor that is disposed on a downstream side of the second valve;
a target receiving unit that receives a target flow rate ratio which is a flow rate distribution ratio for a fluid flowing along the first branch flow path and second branch flow path;
a target flow rate calculating unit that, based on the measured flow rates of the fluid measured by the first flow rate sensor and the second flow rate sensor, and on the target flow rate ratio, calculates target flow rates for the first branch flow path and the second branch flow path; and
an operation setting unit that, based on the target flow rate ratio, sets the control modes of the first fluid control device and the second fluid control device, wherein
the operation setting unit causes the first fluid control device and the second fluid control device to operate in a flow velocity control mode in which a flow velocity of a fluid is controlled on an upstream side of each valve, or in a flow rate control mode in which the flow rate is controlled based on the target flow rates, wherein
the first valve of the first fluid control device operating in the flow velocity control mode or the second valve of the second fluid control device is configured to be controlled on the basis of a measured flow velocity or the flow velocity calculated as the flow velocity of the fluid on the upstream side of each valve.

9. A storage medium storing a program for a flow rate ratio control device that is used in a flow rate ratio control device comprising a main flow path, a plurality of branch flow paths that branch off from a terminus of the main flow path, and a plurality of fluid control devices that are provided respectively on each branch flow path and are each equipped with a valve and a pressure-based flow rate sensor that is disposed on a downstream side of the valve, and that causes a computer to perform the functions of:

a target receiving unit that receives a target flow rate ratio which is a flow rate distribution ratio for a fluid flowing along each branch flow path;
a target flow rate calculating unit that, based on a sum total of measured flow rates of the fluid flowing through each branch flow path as measured by the respective flow rate sensors, and on the target flow rate ratio, calculates a target flow rate for each branch flow path; and
an operation setting unit that establishes settings such that, based on the target flow rate ratio, any one fluid control device from among the plurality of fluid control devices is made to operate in a flow velocity control mode in which a flow velocity of a fluid is controlled on an upstream side of each valve, and the remaining fluid control devices other than the one fluid control device that is operating in the flow velocity control mode are made to operate in a flow rate control mode in which the flow rate is controlled based on the target flow rates, wherein
the valve of the fluid control device which is operating in the flow velocity control mode is configured to be controlled on the basis of a measured flow velocity or the flow velocity calculated as the flow velocity of the fluid on the upstream side of each valve.

10. A flow rate ratio control method that uses a flow rate ratio control device comprising a main flow path, a plurality of branch flow paths that branch off from a terminus of the main flow path, and a plurality of fluid control devices that are provided respectively on each branch flow path and are each equipped with a valve and a pressure-based flow rate sensor that is disposed on a downstream side of the valve, comprising:

a step in which a target flow rate ratio which is a flow rate distribution ratio for a fluid flowing along each branch flow path is received;
a step in which, based on a sum total of measured flow rates of the fluid flowing through each branch flow path as measured by the respective flow rate sensors, and on the target flow rate ratio, a target flow rate is calculated for each branch flow path; and
a step in which settings are established such that, based on the target flow rate ratio, any one fluid control device from among the plurality of fluid control devices is made to operate in a flow velocity control mode in which a flow velocity of a fluid is controlled on an upstream side of each valve, and the remaining fluid control devices other than the one fluid control device that is operating in the flow velocity control mode are made to operate in a flow rate control mode in which the flow rate is controlled based on the target flow rates, wherein
the valve of the fluid control device which is operating in the flow velocity control mode is configured to be controlled on the basis of a measured flow velocity or the flow velocity calculated as the flow velocity of the fluid on the upstream side of each valve.

* * * * *